United States Patent
Zillmer et al.

(10) Patent No.: US 7,654,077 B2
(45) Date of Patent: Feb. 2, 2010

(54) METHOD FOR CONTROLLING AN OPERATION OF A HEATABLE EXHAUST-GAS SENSOR OF A MOTOR VEHICLE

(75) Inventors: Michael Zillmer, Sickte (DE); Matthias Holz, Lehre (DE); Ekkehard Pott, Gifhorn (DE); David Prochazka, Libosovice (CZ)

(73) Assignees: Volkswagen AG, Wolfsburg (DE); Skoda Auto A.S., Mlada Boleslav (CZ)

( * ) Notice: Subject to any disclaimer, the term of this patent is extended or adjusted under 35 U.S.C. 154(b) by 274 days.

(21) Appl. No.: 11/666,792

(22) PCT Filed: Oct. 13, 2005

(86) PCT No.: PCT/EP2005/010988

§ 371 (c)(1),
(2), (4) Date: Apr. 30, 2007

(87) PCT Pub. No.: WO2006/048103

PCT Pub. Date: May 11, 2006

(65) Prior Publication Data

US 2008/0209886 A1   Sep. 4, 2008

(30) Foreign Application Priority Data

Oct. 30, 2004   (DE) .................. 10 2004 052 772

(51) Int. Cl.
*F01N 3/00* (2006.01)

(52) U.S. Cl. .................. 60/277; 60/274; 60/276; 60/285; 60/286; 219/202; 219/492; 219/497; 123/688; 123/697

(58) Field of Classification Search .................. 60/274, 60/275, 276, 277, 284, 286, 300, 303; 219/202, 219/204, 206, 492, 497, 501; 123/688, 697
See application file for complete search history.

(56) References Cited

U.S. PATENT DOCUMENTS 5,590,521 A * 1/1997 Schnaibel et al. ............. 60/274

(Continued)

FOREIGN PATENT DOCUMENTS

DE        198 33 450        1/2000

(Continued)

OTHER PUBLICATIONS

International Search Report, PCT International Patent Application No. PCT/EP2005/010988, dated Apr. 4, 2006.

(Continued)

*Primary Examiner*—Binh Q Tran
(74) *Attorney, Agent, or Firm*—Kenyon & Kenyon LLP

(57) ABSTRACT

A method is for controlling the operation of an exhaust-gas sensor disposed in an exhaust duct of a motor vehicle and equipped with an internal or external sensor heating device, the motor vehicle including a combustion engine and an automatic switchoff, which causes an automatic switching off of the combustion engine when at least one stop condition is present. It is provided that: (a) following an automatic switching off of the combustion engine by the automatic switchoff, a first future instant is determined at which the exhaust-gas temperature in the exhaust duct will drop below a condensation temperature below which condensate precipitation from the exhaust gas may occur; (b) a second instant is determined at which a heat output of the sensor heating device must be interrupted or reduced so that a sensor temperature of the exhaust-gas sensor will have dropped to a maximally allowed sensor temperature no later than the first future instant; and the heat output of the sensor heating device is interrupted or reduced when the second instant is attained.

15 Claims, 3 Drawing Sheets

U.S. PATENT DOCUMENTS

| | | | |
|---|---|---|---|
| 5,928,303 | A | 7/1999 | Sakai |
| 6,304,813 | B1 | 10/2001 | Ikeda et al. |
| 6,476,364 | B1 * | 11/2002 | Shimamura et al. ......... 219/494 |
| 6,781,098 | B2 * | 8/2004 | Toyoda ....................... 219/501 |
| 6,812,436 | B2 * | 11/2004 | Nomura et al. ............. 219/497 |
| 6,973,926 | B2 * | 12/2005 | Ohkuma .................... 123/697 |
| 6,976,483 | B2 * | 12/2005 | Ohkuma .................... 123/697 |
| 7,418,957 | B2 * | 9/2008 | Abe .......................... 123/697 |
| 2004/0030485 | A1 | 2/2004 | Yasui |
| 2004/0031452 | A1 | 2/2004 | Yamazaki |
| 2004/0047396 | A1 | 3/2004 | Nomura et al. |

FOREIGN PATENT DOCUMENTS

| | | |
|---|---|---|
| DE | 100 15 282 | 11/2000 |
| DE | 103 14 754 | 3/2004 |
| DE | 103 36 486 | 4/2004 |
| EP | 1 431 539 | 6/2004 |

OTHER PUBLICATIONS

Written Opinion of the International Searching Authority, PCT International Patent Application No. PCT/EP2005/010988, dated Apr. 4, 2006 (English-language translation provided).

* cited by examiner

METHOD FOR CONTROLLING AN OPERATION OF A HEATABLE EXHAUST-GAS SENSOR OF A MOTOR VEHICLE

FIELD OF THE INVENTION

The present invention relates to a method for controlling the operation of an exhaust-gas sensor disposed in an exhaust duct of a motor vehicle and having an internal or external sensor heating device, the motor vehicle having an internal combustion engine and an automatic switchoff, which causes an automatic switching off of the combustion engine or which suppresses its renewed switching on when at least one stop condition is present. The motor vehicle is, in particular, a hybrid vehicle, which has at least one additional electromotor for its driving. Furthermore, the present invention relates to a motor vehicle having a corresponding sensor control.

BACKGROUND INFORMATION

Motor vehicles usually have one or several exhaust-gas sensors disposed in the exhaust duct, which emit a measuring signal that is proportional to a concentration of at least one exhaust-gas component and allows its concentration to be determined. For instance, Lambda sensors supply a measuring signal that provides information about the oxygen concentration in the exhaust gas and thus about the air-fuel ratio supplied to the internal combustion engine, and $NO_x$ sensors supply a signal that corresponds to the concentration of nitrogen oxides $NO_x$. Most of these sensors require a specific operating temperature for reliable measuring accuracy, which is why they generally have an internal sensor heating device, which heats the sensor to its operating temperature, especially after a cold engine start.

It is conventional in this context that the ceramic elements normally used in the sensors exhibit a very sensitive response to the entry of condensate, especially liquid water, which may lead to damage and malfunction of the sensor. After a cold engine start, these sensors are therefore heated to their operating temperature only if it is ensured, by corresponding heating of the exhaust system, that condensate precipitation is no longer able to occur and act on the sensor at the installation location of the sensor. Prior to reaching the condensation temperature of the exhaust gas, the sensor is usually already preheated to a temperature maximally allowed in view of the ceramic damage to be suppressed, so that the sensor is brought to an operating temperature as quickly as possible once the condensation temperature of the exhaust gas has been exceeded. Models, which calculate the exhaust-gas temperature at the sensor installation, are stored in modern engine controls to control this operation, or a heat input into the exhaust system is accumulated. Only if one or also both of these values is/are exceeded will the sensor heating be controlled accordingly, i.e., switched on or increased so as to attain readiness for operation. As an alternative, the exhaust-gas temperature at the critical location in the exhaust duct may also be measured, using a temperature sensor, and read into the engine control device.

The control of the sensor operation, in particular the sensor heating, is problematic in hybrid vehicles. The term hybrid vehicle includes motor vehicles in which at least two drive units which utilize different energy sources in order to provide the power for the vehicle propulsion are combined with one another. The characteristics of an internal combustion engine, which generates kinetic energy through the combustion of gasoline or diesel fuels, and of an electromachine, which converts electrical energy into kinetic energy, complement each other in an especially advantageous manner, which is why modern hybrid vehicles are predominantly equipped with such a combination. Two different hybrid arrangements may be distinguished. In so-called serial or sequential hybrid arrangements the vehicle propulsion is implemented via the electromotor exclusively, whereas the combustion engine, via a separate generator, generates the electric current for charging an energy store feeding the e-motor or for the direct supply of the electromotor. In contrast, parallel hybrid arrangements in which the vehicle drive may be represented both by the combustion engine and the e-motor are preferred these days. In such parallel arrangements, the electromotor, for instance, is typically switched on in operating points having higher vehicle loads, in order to supplement the combustion engine.

In hybrid vehicles, in operating ranges having only low efficiency, especially in idling range, it is basically desired to operate the combustion engine as little as possible, or even not at all, for reasons of fuel efficiency. To this end, it is conventional to equip the hybrid vehicle with an automatic start-stop system, which includes an automatic switchoff that causes an automatic switching off of the combustion engine (or suppresses its renewed switching on) in response to stop conditions, and an automatic switching on, which effects an automatic start of the combustion engine in response to start conditions. In particular, the combustion engine is switched off by the automatic switchoff in standstill phases, i.e., at a vehicle speed of zero. Automatic start-stop systems exploit the fact that hybrid vehicles have considerably stronger electric starter motors than conventional starter motors, which allows a rapid engine start-up, especially in a restart following an automatic stop.

If, in stop operation of the combustion engine, the exhaust gas still remaining in the exhaust system cools to below the condensation temperature and the sensor is kept at its operating temperature in the meantime, then condensation precipitation may occur and the sensor may be acted upon by the condensate, especially liquid water, in a subsequent restart of the engine, so that damage to the sensor may result. On the other hand, if the sensor heating is also reduced or deactivated as soon as the combustion engine is automatically switched off, then the delay at which the sensor regains its operating temperature after a restart of the engine leads to an insufficiently precise engine control and thus to increased emission levels and/or increased fuel consumption.

SUMMARY

According to example embodiments of the present invention, a method is provided for controlling a heatable exhaust-gas sensor, in particular, in a hybrid vehicle having an automatic switchoff, the method keeping the sensor in readiness for operation for as long as possible in stop operation of the combustion engine and the subsequent restart while simultaneously protecting the sensor from damage caused by condensate action. Furthermore, a motor vehicle having a correspondingly optimized sensor control is provided.

According to example embodiments of the present invention, it is provided that:

(a) following an automatic switching off of the combustion engine by the automatic switchoff, a first future instant is determined at which the exhaust-gas temperature in the exhaust duct will drop below a condensation temperature below which condensate precipitation from the exhaust gas may occur;

(b) a second instant is determined at which a heat output of the sensor heating device must be interrupted or reduced so that a sensor temperature of the exhaust-gas sensor will have dropped to a maximally allowed sensor temperature no later than the first future instant; and (c) the heat output of the sensor heating device is interrupted or reduced once the second instant has been attained.

In an automatic switchoff of the combustion engine, the expected future temperature characteristic of the exhaust gas still remaining in the exhaust duct is therefore extrapolated so as to determine the instant at which it will attain or drop below the critical condensation temperature, in particular, of water. Furthermore, to prevent that the exhaust-gas sensor at this instant still has a temperature at which sensor damage by the action of condensate is to be expected, a second instant is determined at which its heating is to be reduced or interrupted completely, taking the expected cooling rate of the sensor into account. The interruption or reduction of the sensor heating is implemented only if this second instant has actually been reached. This provides that the exhaust-gas sensor is kept in readiness for operation for a maximally possible period of time when the combustion engine is switched off. If the combustion engine is switched on again before the calculated second instant has been attained, the heat output is not reduced, so that the sensor is in its operating state again immediately upon start-up of the engine, thereby allowing an optimal engine control, in particular, of the air/fuel mixture (Lambda control). The sensor heating will be reduced only when the second instant is attained, with the combustion engine shut off, thereby providing that the sensor has reached or dropped below its critical temperature when the condensation temperature of the exhaust gas is reached, so that it is protected from damage by condensate action.

As already mentioned, the instant at which the temperature of the exhaust gas present in the exhaust duct will most likely exceed the condensation temperature is determined with the aid of an expected characteristic of the exhaust-gas temperature.

It may be determined, for instance, with the aid of an empirical model in which the actually occurring temperature characteristic is measured inside the vehicle and/or on engine test stands, for instance, possibly under different marginal conditions (starting temperature of the exhaust gas, outside temperature, etc.). The measuring data may be stored in the engine control, for example, in the form of characteristics maps. As an alternative, the temperature characteristic to be expected may also be determined by a physical model in which physical laws are applied and, optionally, various parameters are taken into account, such as geometrical conditions of the exhaust system, thermal conductivities of the components of the exhaust system, in particular, the exhaust pipe, outside temperature and/or the instantaneous exhaust-gas temperature and others. Furthermore, combined empirical-physical computational models are possible, as are models based on a temperature measured at another location in the exhaust gas.

For a most precise determination of the actual risk to the exhaust-gas sensor by condensate action, the temperature characteristic to be expected may be determined for the installation location of the exhaust-gas sensor in the exhaust duct. The temperature characteristic for a position upstream from the exhaust-gas sensor may be extrapolated as an alternative or in addition, in particular, for a position where a maximum cooling rate is present and thus the lowest temperatures. If condensate precipitation occurs at such an upstream position of the sensor during engine standstill, this condensate may detach during the engine restart and be carried into the sensor.

The first instant at which the condensation temperature in the exhaust duct will likely not be attained may be recalculated continuously and corrected during the stop operation of the engine and prior to reaching the second instant (switchoff instant of the sensor heating) as a function of an instantaneous, e.g., measured exhaust-gas temperature. In this manner, a temperature characteristic of the exhaust gas that deviates from the prognosis is able to be taken into account and the switchoff instant of the sensor heating adapted in an ongoing manner.

The determination of the second instant at which the heat output of the sensor heating device is to be reduced or interrupted may be implemented with the aid of a characteristic of the sensor temperature to be expected in a switched-off combustion engine. In particular, the characteristic of the sensor temperatures is determined as a function of the previously determined characteristic of the exhaust-gas temperature, especially at the installation location of the sensor or upstream therefrom. An empirical model based on measured values, a physical model or a combined empirical-physical model also may be utilized for the sensor temperature characteristic. In both cases an instantaneously measured exhaust-gas temperature and/or the outside temperature may be taken into account.

After reaching the second instant, the temperature of the exhaust-gas sensor may be kept at the maximally allowed sensor temperature, and the heat output may be reduced completely or partially. This keeps the sensor in a pre-warming state and allows it to be rapidly heated to the operating temperature again in a restart of the combustion engine.

Furthermore, example embodiments of the present invention provide a motor vehicle having a combustion engine, in particular, a hybrid vehicle having an additional electromotor, an exhaust-gas sensor which is disposed in an exhaust duct of the combustion engine and equipped with an internal or external sensor heating device, and an automatic switchoff, which causes an automatic switching off of the combustion engine in response to the presence of at least one stop condition. The vehicle includes a control device for controlling the operation of the exhaust-gas sensor according to the afore-described method. In particular, the control device includes a program algorithm for implementing the control, which may be stored in the engine control device or in a separate control unit.

Example embodiments of the present invention are described in more detail below with reference to the appended Figures.

DETAILED DESCRIPTION

Figure 1:
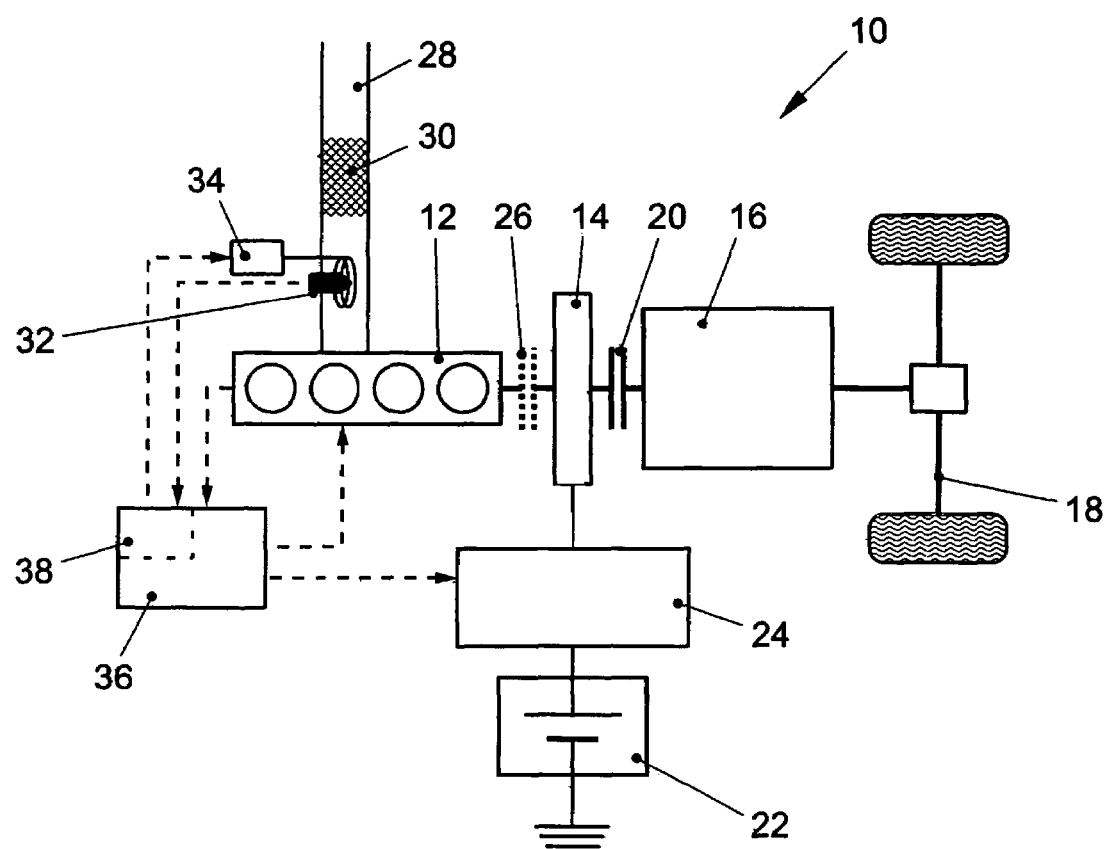
FIG. 1 schematically illustrates a configuration of a hybrid drive unit according to example embodiments of the present invention.

In FIG. 1, 10 as a whole denotes a hybrid drive unit of a hybrid vehicle. The driving of the vehicle is optionally or simultaneously implemented by a conventional combustion engine 12 (Otto or diesel engine) and an electromotor 14, which both act on the same shaft. In particular, electromotor 14 acts on the crankshaft of combustion engine 12 either directly or via a transmission or via a belt, a toothed belt or some other non-positive and/or positive connection. Via a transmission 16 (automatic or manual transmission), combustion engine 12 and electromotor 14 are connected to a drive train 18. The decoupling of the drive shafts of combustion engine 12 or electromotor 14 from transmission 16 is implemented with the aid of a clutch 20, which is able to be released by the driver by activation of a clutch pedal and which is locked when not activated.

Electromotor 14, which is a three-phase asynchronous motor or three-phase synchronous motor, for instance, may optionally be operated via motor or generator operation. In motor operation, electromotor 14 drives drive train 18 by using electrical energy (current). Electromotor 14 obtains it from an energy store 22, which may be, for instance, a battery and/or a capacitor store. In addition, the motor operation of electromotor 14 may supplement the switched-on combustion engine 12. In contrast, in generator operation, electromotor 14 is driven by combustion engine 12 or by the thrust of the vehicle and converts the kinetic energy into electric energy to replenish energy store 22. The switching of electromotor 14 between motor and generator operation is implemented by power electronics 24, which simultaneously carry out a possibly required conversion between direct and alternating current.

According to the illustrated arrangement, the vehicle is driven predominantly by combustion engine 12, which is started by electromotor 14 configured as starter generator. Furthermore, electromotor 14 assumes a boost function in that it is switched on in high load situations, in particular, when the vehicle is accelerated, so as to boost the vehicle drive (motor operation). On the other hand, in driving situations where there is an excess of kinetic energy of the vehicle, electromotor 14 has a so-called recuperation function in that, during generator operation, it converts the energy of motion into kinetic energy for charging energy store 22 and thereby simultaneously provides a brake torque. Electromotor 14 may have an output of maximally 40 kW, in particular, 8 to 15 kW.

Furthermore, an additional clutch 26 is illustrated in FIG. 1, which may be disposed between combustion engine 12 and electromotor 14. Such an additional clutch 26 allows the separate decoupling of combustion engine 12 from drive train 18 or from electromotor 14, thereby resulting in the feature that its mechanical friction resistances need not be "dragged along" when combustion engine 12 is switched off. Additional clutch 26 therefore does provide additional potential savings with regard to fuel, but this entails considerable expenditure in terms of money, manufacture and space, which is why it may not be provided.

Exhaust gas coming from combustion engine 12 is routed through an exhaust duct 28 in which a catalytic converter 30 is provided for catalytic purification of the exhaust gas. This may be a hot-end precatalyst to which a main catalyst is post-connected. For control of combustion engine 12 and the emission control system, various sensors, which supply a measuring value that is proportional to a concentration of an exhaust-gas component, are normally installed in exhaust duct 28. In the example illustrated, a Lambda sensor 32 is disposed upstream from catalytic converter 30, which allows the oxygen concentration in the exhaust gas to be determined, and thus the air/fuel ratio supplied to combustion engine 12. The air/fuel ratio of engine 12 is adjusted as a function of the measuring signal from Lambda sensor 32 via the so-called Lambda control. Lambda sensor 32 requires a specific operating temperature to be able to supply reliable measuring signals, and for this reason it is equipped with a sensor heating device 34. For better understanding, heating device 34 is represented by an external element in the illustration at hand. However, Lambda sensors and other gas sensors usually have an internal heating device.

The control of the operation of combustion engine 12, power electronics 24 and sensor heating device 34 is implemented by an engine control device 36 in which a program algorithm, indicated by 38, for control of the sensor operation is stored whose mode of operation is described in the following text. Alternatively, program algorithm 38 may also be provided in a separate control unit.

The sequence of the present method for controlling heatable Lambda sensor 32 according to example embodiments is described with reference to FIGS. 2 and 3. In the center portion of FIG. 3, the characteristic of exhaust-gas temperature T_AG in exhaust duct 28 in the region of the installation location of Lambda sensor 32 is shown, and in the upper portion the characteristic of sensor temperature T_LS of Lambda sensor 32. In the bottom portion of the figure, vehicle velocity v_fzg is shown. Vehicle velocity v_fzg drops from an initially constant level before reaching 0 km/h at instant t0, i.e., when vehicle standstill occurs. Such a situation may arise in a stop in front of a traffic light, for example. A vehicle velocity of 0 or close to 0 constitutes a stop condition, so that combustion engine 12 is switched off by the automatic switchoff stored in engine control 36. Sensor 32, which at instant t0 is still being heated by sensor heating device 34, initially still retains its relative sensor temperature T_LS. In contrast, as soon as the stop operation of combustion engine 12 sets in, exhaust gas temperature T_AG begins to cool inside exhaust duct 28, which now no longer has exhaust gas flowing through it.

Figure 2:
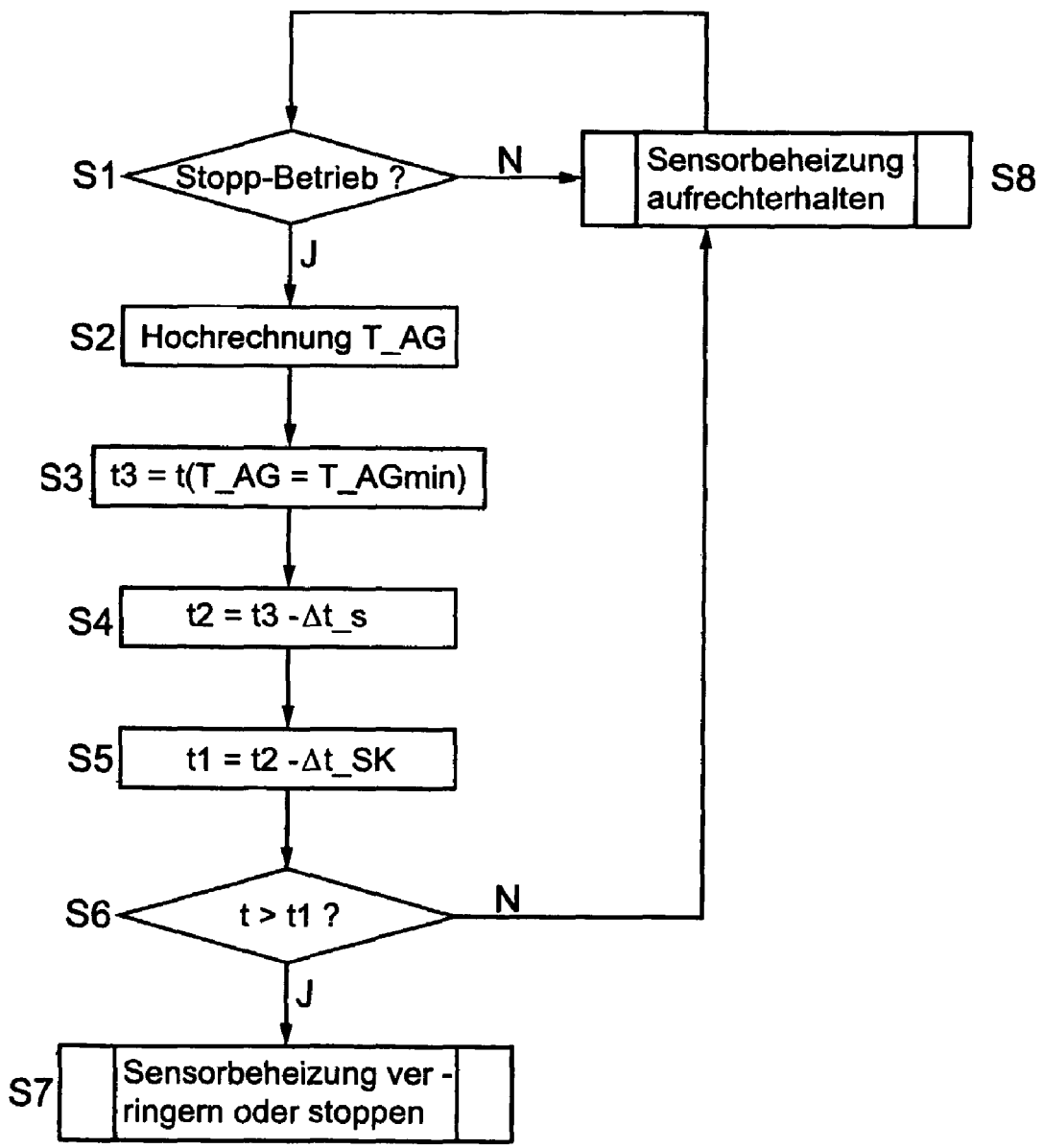
FIG. 2 is a flow chart illustrating a procedure for implementing a sensor control according to example embodiments of the present invention.
Figure 3:
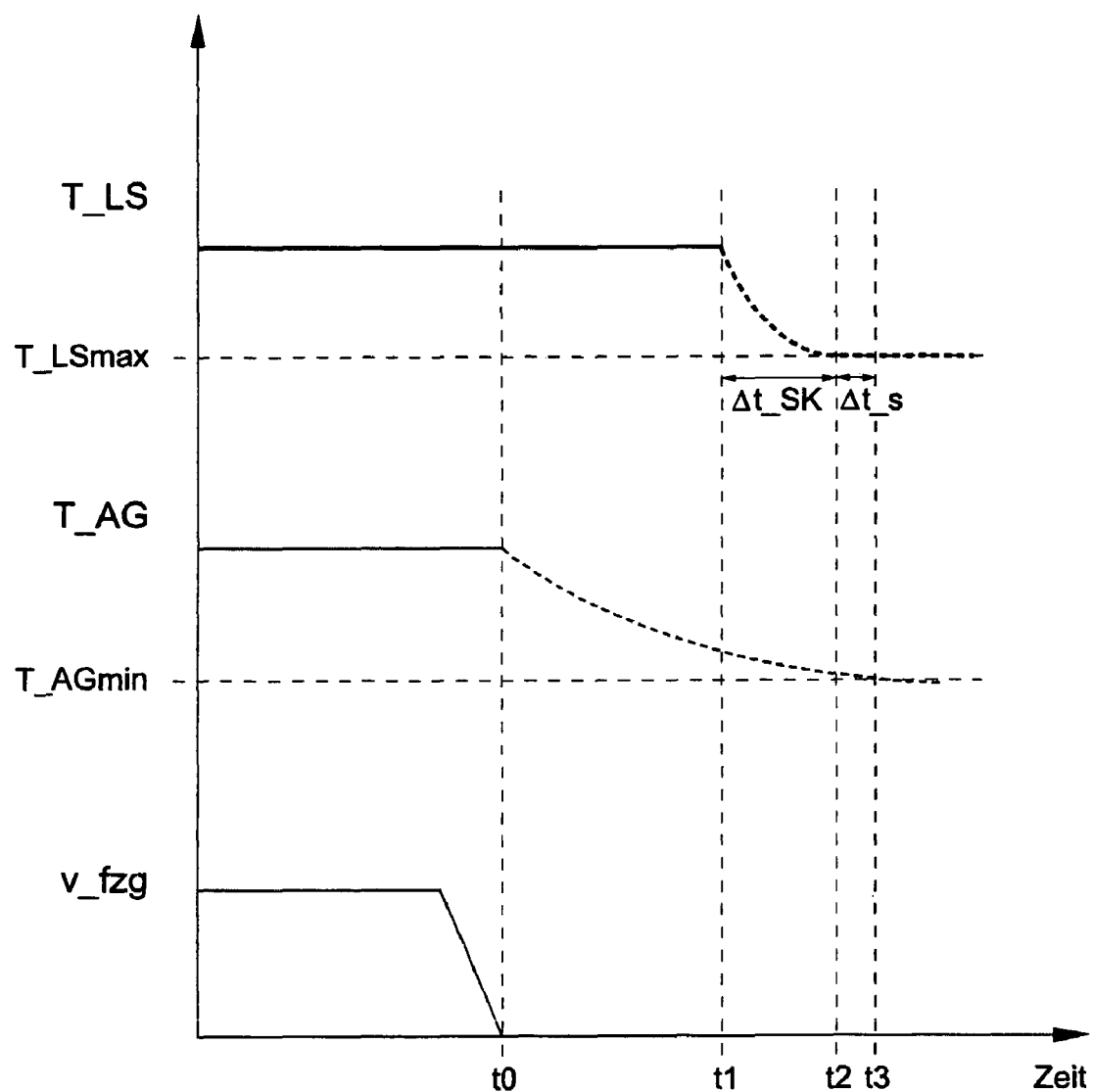
FIG. 3 illustrates time characteristics of various characteristic quantities during an automatic switchoff of a combustion engine of a motor vehicle according to example embodiments of the present invention.

According to FIG. 2, the method for controlling sensor 32 begins with step 1, in which an initial query takes place as to whether a stop operation of combustion engine 12 is present. If a stop operation is present, it should additionally be provided at this point that the vehicle is not meant to be switched off permanently, i.e., for example, that an ignition key or switch is not in the OFF position. If the query in step S1 is answered in the affirmative, i.e., combustion engine 12 is in stop operation and the vehicle is not to be switched off permanently, the method transitions to step S2, where an extrapolation of the expected characteristic of exhaust-gas temperature T_AG takes place. The extrapolation may utilize, for instance, an empirical model based on measured values, or also a physical model. In the empirical model, cooling characteristics of the exhaust gas measured in experiments are utilized. These data are stored in engine control 36. The measurement of the temperature characteristic may be recorded under different marginal conditions, in particular, different initial temperatures of the exhaust gas and different outside temperatures, and stored. As an alternative, a physical model may be used to determine the expected temperature characteristic of the exhaust gas, physical laws being applied for advance calculation of the temperature characteristic. Specific parameters such as the geometry of the exhaust system, the thermal conductivities of the components of the exhaust system, the outside temperature and/or the instantaneous exhaust-gas temperature may be taken into account. The dashed curve in FIG. 3 illustrates the expected temperature characteristic of exhaust gas T_AG predicted by the extrapolation in step S2. In the following step S3, expected characteristic of exhaust-gas temperature T_AG is used to determine instant t3 at which exhaust-gas temperature T_AG is expected to have dropped to a specified lower temperature threshold T_AGmin. Temperature threshold T_AGmin corresponds to a temperature below which condensate precipitation, especially of water, is possible. Temperature threshold T_AGmin therefore substantially corresponds to the temperature of the saturation vapor pressure of the water in the exhaust gas at standard pressure, typically approximately 50° C.

It is to be avoided that, at instant t3, Lambda sensor 32 still has a sensor temperature T_LS at which it could be damaged if exposed to the action of condensate. This sensor temperature T_LSmax maximally allowed at an exhaust-gas temperature of ≦T_AGmin is illustrated in the upper portion of FIG. 3. In order to provide a particularly reliable protection of sensor 32 from condensate action, in subsequent step S4, a safety period Δt_s, at which the exhaust gas is expected to reach condensation temperature T_AGmin, is deducted from the previously determined instant t3. This results in instant t2, which corresponds to a targeted instant at which sensor temperature T_LS is expected to have cooled to the maximally permissible sensor temperature T_LSmax.

In the following step S5, instant t1 is determined at which the heat output of sensor device 34 must be interrupted or at least reduced so that sensor temperature T_LS of Lambda sensor 32 at instant t2, but no later than instant t3, will have dropped to critical sensor temperature T_LSmax. To this end, a sensor cooling period Δt_SK is subtracted from instant t2. Sensor cooling period Δt_SK is determined with the aid of an expected characteristic of sensor temperature T_LS (illustrated by dashed line in FIG. 3) when combustion engine 12 is shut off. This expected sensor temperature characteristic T_LS may be implemented as a function of the characteristic of exhaust-gas temperature T_AG predicted in step S2. Here, too, an empirical model based on measured values or a physical model may be utilized.

In the following query in step S6, it is checked whether targeted switchoff instant t1 at which heating device 34 of Lambda sensor 32 is to be switched off (or its output reduced), has already been reached since the stop operation of combustion engine 12 at instant t0. If this query is answered in the negative, i.e., instant t1 has not yet been reached, the sensor heating will be maintained, so that Lambda sensor 32 retains its optimal operating temperature (step S8). However, if the query in step S6 is answered in the affirmative, i.e., instant t1 has been reached, the method transitions to step S7 in which the sensor heating is stopped (or reduced).

The afore-described method steps S2 through S6, which focus on determining and monitoring the targeted switchoff instant t1, are implemented immediately following the automatic switching off of combustion engine 12 at instant t0. However, it may be provided that the determination of switchoff instant t1 of the sensor heating be corrected on a continuous basis until this instant has been reached, i.e., in time interval t0 to t1, in that an exhaust-gas temperature T_AG actually present in exhaust duct 28 is determined and taken into account. Actual exhaust-gas temperature T_AG may be measured by, for instance, a temperature sensor disposed in exhaust duct 28 in the region of Lambda sensor 32 or upstream therefrom. This may further improve the accuracy of the method.

In a situation where the restart of combustion engine 12 occurs at already reduced or switched-off sensor heater output (t>t1), it may be checked whether exhaust-gas temperature T_AG has already dropped below condensation temperature T_AGmin. If this is not the case, since no condensate precipitation can have occurred, a maximally allowed heater output will immediately be reapplied to the sensor so that the sensor is able to regain its operating temperature as quickly as possible and the Lambda control may be provided. In the event that exhaust-gas temperature threshold T_AGmin has already been undershot, it is additionally provided to specify a relatively lower heat output after renewed exceeding of threshold T_AGmin (or, alternatively, after exceeding a minimum value for an exhaust-gas heat quantity entered into the exhaust system), in order to prevent possible damage to sensor 32 by condensate residue. The intensity of the heat output may be additionally coupled to the temperature difference by which exhaust-gas temperature T_AG previously undershot condensation threshold T_AGmin. As an alternative, it is also possible to specify a tolerance time range for which condensation temperature T_AGmin may be undershot while still allowing the maximum heat output immediately. In such cases, given very small time periods, it may be assumed that only a very small condensate mass has precipitated.

The described method sequence may ensure that the sensor heating and thus the sensor temperature is reduced to a threshold T_LSmax prior to potential condensate precipitation in the exhaust system, so that no damage by condensate acting on the sensor has to be expected. In addition, it may be provided that the sensor remains operative over a maximally possible period in stop operation of combustion engine 12 and, in a subsequent restart of the engine, it is therefore able to precisely adhere to the setpoint Lambda value, due to a Lambda control that stays enabled. This may provide an optimal emission quality, and thus a high conversion rate of downstream catalytic converter 30, as well as low fuel consumption due to a precise Lambda control, especially in the non-stationary operating phase of combustion engine 12 following its restart (in the form of an acceleration operation, for example), which is generally accompanied by higher exhaust mass flows.

LIST OF REFERENCE CHARACTERS 10 hybrid drive unit
12 combustion engine
14 electromotor
16 transmission
18 drive train
20 clutch
22 energy store/battery
24 power electronics
26 additional clutch
28 exhaust duct
30 catalytic converter
32 exhaust-gas sensor/Lambda sensor
34 sensor heating device
36 engine control device
38 program algorithm
T_AG exhaust-gas temperature
T_AGmin condensation temperature of the exhaust gas
T_LS sensor temperature
T_LSmax maximally allowed sensor temperature at condensation temperature of the exhaust gas
t0 start of stop operation of the combustion engine
t1 start of reduction or interruption of sensor heating
t2 reaching of maximally allowed sensor temperature
t3 reaching of the condensation temperature of the exhaust gas
Δt_s safety period
Δt_SK sensor cooling period
v_fzg vehicle velocity

What is claimed is:

1. A method for controlling operation of an exhaust-gas sensor disposed in an exhaust duct of a motor vehicle and equipped with one of (a) an internal and (b) an external sensor heating device, the motor vehicle including a combustion engine and an automatic switchoff configured to cause an automatic switching off of the combustion engine when at least one stop condition is present, comprising:

following an automatic switching off of the combustion engine by the automatic switchoff, determining a first future instant at which an exhaust-gas temperature in the exhaust duct will drop below a condensation temperature below which condensate precipitation from the exhaust gas may occur;

determining a second instant at which a heat output of the sensor heating device must be one of (a) interrupted and (b) reduced so that a sensor temperature of the exhaust-gas sensor will have dropped to a maximally allowed sensor temperature no later than the first future instant; and one of (a) interrupting and (b) reducing heat output of the sensor heating device when the second instant is attained.

2. The method according to claim 1, wherein the second instant is determined in the second instant determining step taking into account a safety period by which the second instant is advanced.

3. The method according to claim 1, wherein the first future instant is determined in the first future instant determining step in accordance with a characteristic of the exhaust-gas temperature that is to be expected when the combustion engine is switched off.

4. The method according to claim 3, further comprising determining the expected temperature characteristic in accordance with an empirical model based on measured values and taking into account at least one of (a) an outside temperature and (b) an instantaneous exhaust-gas temperature.

5. The method according to claim 3, further comprising determining the expected temperature characteristic in accordance with a physical model, which calculates the temperature characteristic taking into account at least one of (a) geometric conditions of an exhaust system, (b) thermal conductivities of the exhaust system, (c) an outside temperature and (d) an instantaneous exhaust-gas temperature.

6. The method according to claim 3, further comprising determining the expected temperature characteristic for at least one of (a) an installation location of the exhaust-gas sensor, (b) a position upstream from the exhaust-gas sensor and (c) a position having a maximum cooling rate.

7. The method according to claim 1, further comprising continuously correcting the first future instant as a function of a measured instantaneous exhaust-gas temperature during the stop operation of the combustion engine and prior to reaching the second instant.

8. The method according to claim 1, wherein the second instant is determined in the second instant determining step in accordance with a characteristic of the sensor temperature to be expected when the combustion engine is switched off.

9. The method according to claim 8, further comprising determining the expected characteristic of the sensor temperature as a function of a determined characteristic of the exhaust-gas temperature.

10. The method according to claim 8, further comprising determining the expected characteristic of the sensor temperature in accordance with an empirical model based on at least one of (a) measured values, (b) a physical model and (c) a combined empirical-physical model.

11. The method according to claim 1, further comprising maintaining the sensor temperature of the exhaust-gas sensor once the maximally allowed sensor temperature is reached.

12. A motor vehicle, comprising:

a combustion engine;

an exhaust-gas sensor arranged in an exhaust duct of the combustion engine and including one of (a) an internal and (b) an external sensor heating device;

an automatic switchoff device configured to cause the combustion engine to be switched off automatically if at least one stop condition is present; and a control device configured to control operation of the exhaust-gas sensor to provide that:

following an automatic switching off of the combustion engine by the automatic switchoff device, a first future instant is determined at which an exhaust-gas temperature in the exhaust duct will drop below a condensation temperature below which condensate precipitation from the exhaust gas may occur;

a second instant is determined at which a heat output of the sensor heating device must be one of (a) interrupted and (b) reduced so that a sensor temperature of the exhaust-gas sensor will have dropped to a maximally allowed sensor temperature no later than the first future instant; and heat output of the sensor heating device is one of (a) interrupted and (b) reduced when the second instant is attained.

13. The motor vehicle according to claim 12, wherein the control device includes a program algorithm configured to implement the control, the program algorithm stored in one of (a) an engine control device and (b) a separate control unit.

14. The motor vehicle according to claim 12, wherein the exhaust-gas sensor includes one of (a) a Lambda sensor and (b) a NOx sensor.

15. The motor vehicle according to claim 12, wherein the motor vehicle is arranged as a hybrid vehicle including at least one electromotor.

* * * * *